(12) United States Patent
Bellows et al.

(10) Patent No.: US 8,478,968 B2
(45) Date of Patent: *Jul. 2, 2013

(54) SYNCHRONIZING COMMANDS AND DEPENDENCIES IN AN ASYNCHRONOUS COMMAND QUEUE

(75) Inventors: Gregory H. Bellows, Austin, TX (US); Joaquin Madruga, Austin, TX (US); Ross A. Mikosh, Austin, TX (US); Brian D. Watt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/466,620

(22) Filed: May 8, 2012

(65) Prior Publication Data

US 2012/0221836 A1  Aug. 30, 2012

Related U.S. Application Data

(63) Continuation of application No. 12/551,526, filed on Aug. 31, 2009, now Pat. No. 8,316,219.

(51) Int. Cl.
*G06F 9/30* (2006.01)
*G06F 9/40* (2006.01)
*G06F 15/00* (2006.01)

(52) U.S. Cl.
USPC ........................................................ 712/216

(58) Field of Classification Search
None
See application file for complete search history.

(56) References Cited

U.S. PATENT DOCUMENTS

| | | | |
|---|---|---|---|
| 5,021,945 A | 6/1991 | Morrison et al. | |
| 5,548,795 A | 8/1996 | Au | |
| 6,272,565 B1 * | 8/2001 | Lamberts | 710/43 |
| 6,311,256 B2 * | 10/2001 | Halligan et al. | 711/158 |
| 6,928,533 B1 | 8/2005 | Eisen et al. | |
| 7,043,567 B2 * | 5/2006 | Trantham | 710/6 |
| 7,177,982 B2 | 2/2007 | Barrick | |
| 7,243,200 B2 | 7/2007 | Day et al. | |
| 2007/0174493 A1 | 7/2007 | Irish et al. | |
| 2011/0055531 A1 | 3/2011 | Bellows et al. | |

* cited by examiner

*Primary Examiner* — Corey S Faherty
(74) *Attorney, Agent, or Firm* — Matthew B. Talpis; Gregory K Goshorn; Greg Goshorn, P.C.

(57) ABSTRACT

Provided are techniques for the managing of command queue dependencies and command queue synchronization. Incoming commands are actively tracked through their dependency relationships. Command dependencies may be tracked across multiple lists, including a submission list and a completion list. Each command on the submission list is prepared for processing and ultimately submitted to command processing logic. Command completion processing is performed on each command on the completion list, including by not limited to removing dependencies from pending commands and possibly queuing pending commands for submission to the command processing logic. Also provided as features of a command queue are a standby barrier, an active barrier and a marker. Standby and active barriers are employed to synchronize and track commands through the command queue. Markers are employed to track commands through the command queue.

13 Claims, 9 Drawing Sheets

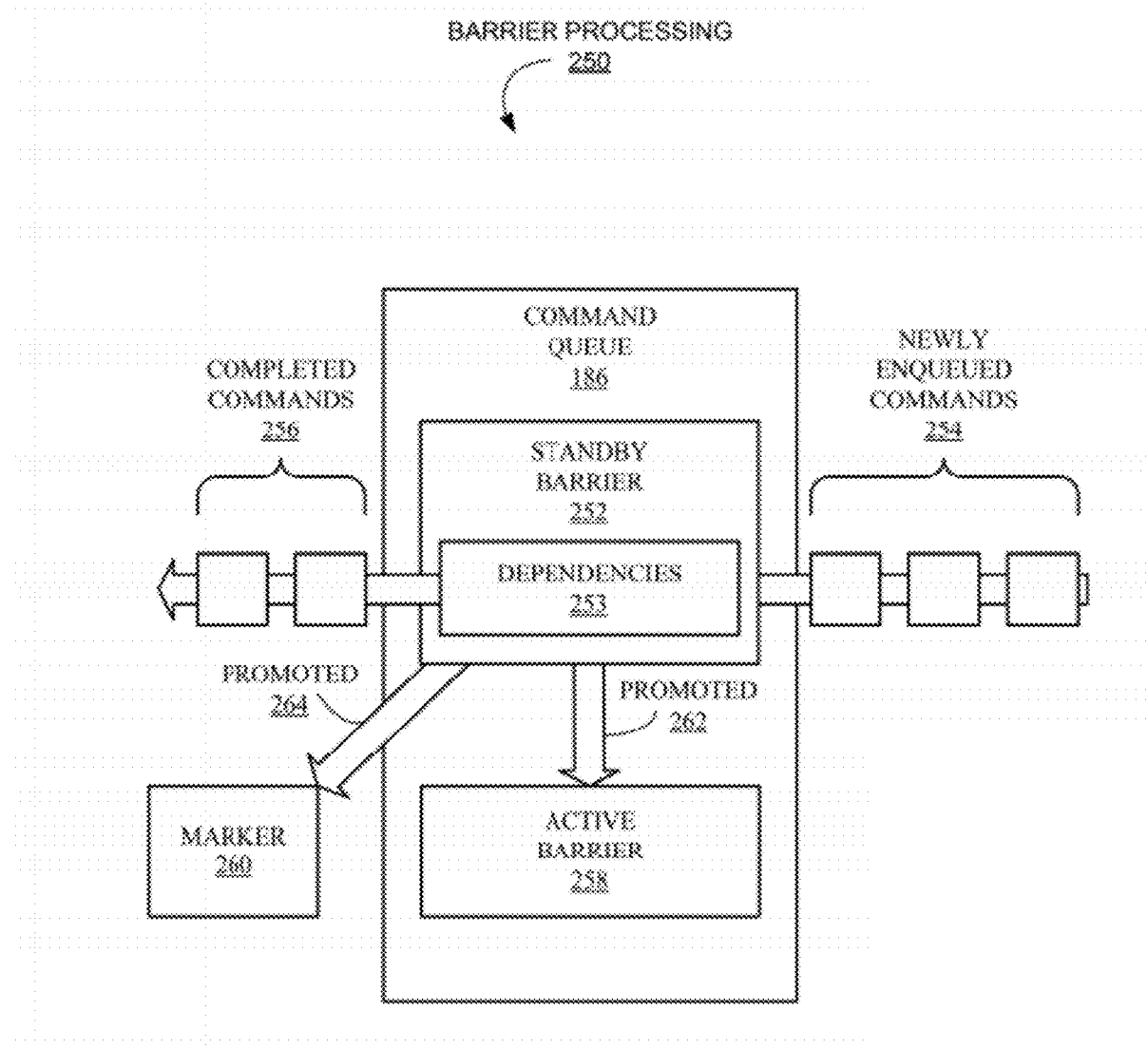

SYNCHRONIZING COMMANDS AND DEPENDENCIES IN AN ASYNCHRONOUS COMMAND QUEUE

CROSS-REFERENCES TO RELATED APPLICATIONS

The present application is a continuation and claims the benefit of the filing date of an application entitled, "Synchronizing Commands and Dependencies in an Asynchronous Command Queue" Ser. No. 12/551,526, filed Aug. 31, 2009, assigned to the assignee of the present application, and herein incorporated by reference.

FIELD OF DISCLOSURE

The claimed subject matter relates generally to computing command scheduling and, more specifically, to techniques for managing command dependencies and command queue synchronization.

SUMMARY

Provided are processing commands in a computing system, comprising receiving a first command for execution in a computing system; entering the first command in a first standby barrier, wherein the first standby barrier depends upon the first command; promoting the first standby barrier to become a promoted barrier; generating a second standby barrier, wherein the second standby barrier depends upon the first standby barrier; receiving a second command for execution in the computing system; entering the second command in the second standby barrier, wherein the second standby barrier depends upon the second command; executing the first command; and removing the first command as a dependency of the promoted barrier.

This summary is not intended as a comprehensive description of the claimed subject matter but, rather, is intended to provide a brief overview of some of the functionality associated therewith. Other systems, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

FIG. 10 is a block diagram illustrating an example of the processing of commands with respect to standby and active barriers and markers according to the claimed subject matter.

DETAILED DESCRIPTION

Figure 1:
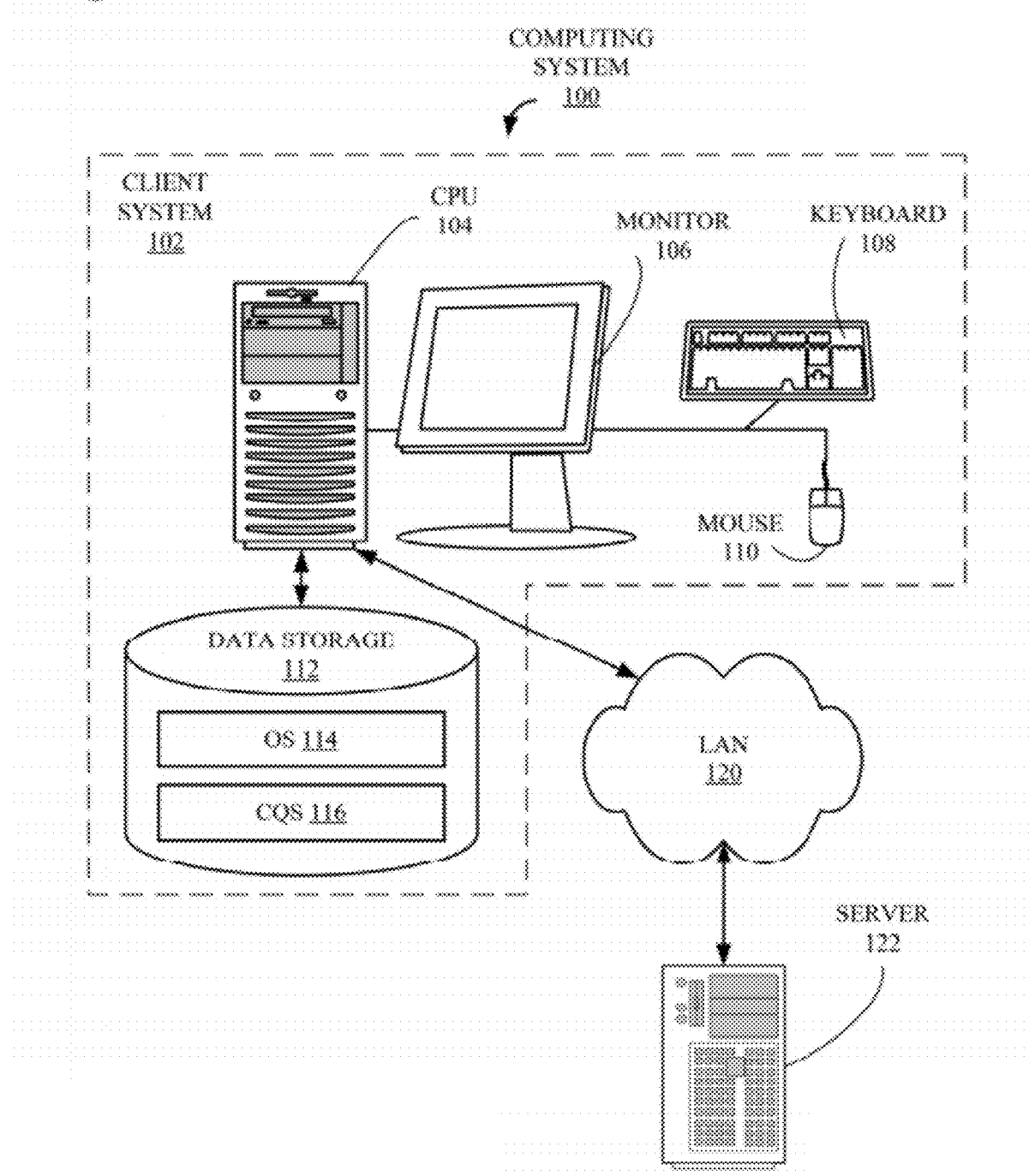
FIG. 1 is one example of a computing system architecture that may implement the claimed subject matter.

Provided are techniques for managing command queue dependencies and command queue synchronization. Commands are minimally, yet pro-actively, tracked through a queuing infrastructure with little list manipulation. Incoming commands are actively tracked through their dependency relationships. In addition command dependencies may be tracked across multiple lists. For example, provided are a submission list and a completion list. Each command on the submission list is prepared for processing and ultimately submitted to command processing logic in a first-in/first-out (FIFO) manner. Command completion processing is performed, also in a FIFO manner, on each command on the completion list including, but not limited to, removing dependencies from pending commands and possibly queuing pending commands for submission to the command processing logic.

Also provided as features of a command queue are a standby barrier, an active barrier and a marker. The standby is an actual command, the active barrier is a pointer to an actual command and a marker is a type of command. However, although on the command queue, the standby barrier, the active barrier and the marker not submitted for processing. The standby and active barriers are employed to synchronize and track commands through the command queue. The standby barrier is an entry on the command queue used to track outstanding activity on the queue. Incoming commands are added as dependencies of a standby barrier and, thus the standby barrier is dependent upon those incoming commands. As commands are completed, they are removed as dependencies of the standby barrier. At any time, a standby barrier may be "promoted." A promoted standby barrier is closed from tracking queue activity, becomes active in the command stream and has dependencies like a conventional command. Once promoted, a standby barrier is replaced with a new, empty standby barrier that accepts any new incoming commands. In addition, the new standby barrier is added as a dependent of the promoted standby barrier.

A standby barrier may be promoted in one of two ways: 1) by conversion into an active barrier or 2) by conversion into a marker. An active barrier occupies the command queue's "active barrier" slot, causing all future incoming commands to become dependent upon it. As stated above, the active barrier is dependent upon the outstanding commands on the queue prior to the promotion. By association, any new incoming commands are "blocked" or dependent on the completion of commands issued before the barrier was promoted. This technique is employed to synchronize the command queue.

A marker is not blocking so it does not assume the role of an active barrier. However like an active barrier, a marker assumes dependencies from the commands that were outstanding on the queue prior to promotion. In this manner, the marker becomes a tracking point for these commands. Unlike the active barrier, new incoming commands do not automatically become dependent upon the marker. A command may explicitly state that it is dependent upon a marker, but it is not implied as in the case of an actual active barrier.

In addition to the standby and active barriers, a "custom" barrier is also provided as a feature of the command queue. A custom barrier does not involve the promotion of a standby barrier. A custom barrier is associated with a set of "custom" dependencies rather than with all outstanding commands that a standby barrier has been tracking. Thus, upon creation of a custom barrier, the existing standby barrier is not replaced. The custom barrier is made active by virtue of placement in the command queue's active barrier slot. Just like the previous active barrier, all new incoming commands assume the custom barrier as a dependent and are thus blocked until the commands associated with the custom barrier are completed. In addition, a custom barrier assumes any active barrier as a dependency, like newly enqueued commands.

As will be appreciated by one skilled in the art, aspects of the present invention may be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for command queue control in a computing system. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other, programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, current techniques require memory and overhead that degrades performance, ultimately hindering command throughput. Out-of-order command processing may require list manipulation and: queue look-ups that are inefficient. These issues become even more complicated when dependent relationships are shared between commands issued on separate command queues.

Turning now to the figures, FIG. 1 is one example of a computing system architecture 100 that may implement the claimed subject matter. A client system 102 includes a central processing unit (CPU) 104. CPU 104 may include multiple processors (not shown), each of which may include multiple processing cores (not shown). Those with skill in the computing arts should appreciate the many different configurations possible for CPU 104.

Client system 102 and processor 104 are coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an operating system 114, which controls the operation of client system 102, and an example of a Command Queue System (CQS) 116 that implements the claimed subject matter. CQS 116 is described in more detail below in conjunction with FIGS. 2-10.

Client system 102 and CPU 104 are connected to the Internet 120, which is also connected to a server computer 122. Although in this example, CPU 104 and server 122 are communicatively coupled via the Internet 120, they could also be coupled through any number of communication mediums such as, but not limited to, a local area network (LAN) (not shown). Further, it should be noted there are many possible computing system configurations that might implement the claimed subject matter, of which computing system 100 is only one simple example.

Figure 2:
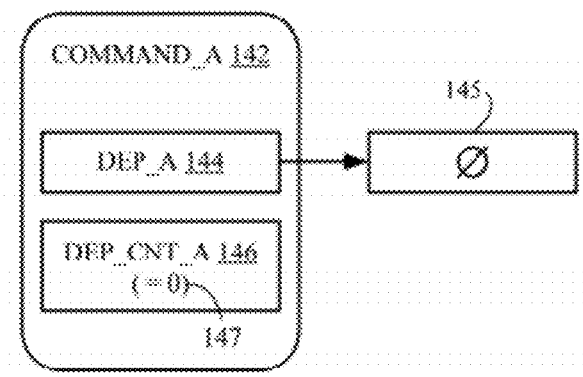
FIG. 2 is a block diagram representing an example of a first issued computing command structure that may implement the claimed subject matter.

FIG. 2 is a block diagram representing an example of a first issued computing command, i.e. a "command_A," 142 that is employed throughout the Specification to explain aspects of the claimed subject matter. Command_A 142 is illustrated as storing information related to the execution of command_A 142, specifically data identifying any other commands on which command_A may depend. One computing command "depends" upon a second command if execution of the first command is required to wait until completion of execution of the second command. It should be noted that command dependencies may be nested, for example if a third command depends upon a second command that depends upon a first command. In this example, the first command is said to depend upon the third command in addition to the second command.

Storage for a list of commands which depend upon command_A 142 is in a location "dep_A" 144. Dep_A 144 is illustrated as storing a NULL variable 145, which indicates that there are currently no other commands that depend upon command_A 142. Storage for a count of a number of commands that depend upon command_A 142 is stored in a location "dep_cnt_A" 146. In this example, since no other commands depend upon command_A, dep_cnt_A 146 is shown storing the value of '0' 147.

Figure 3:
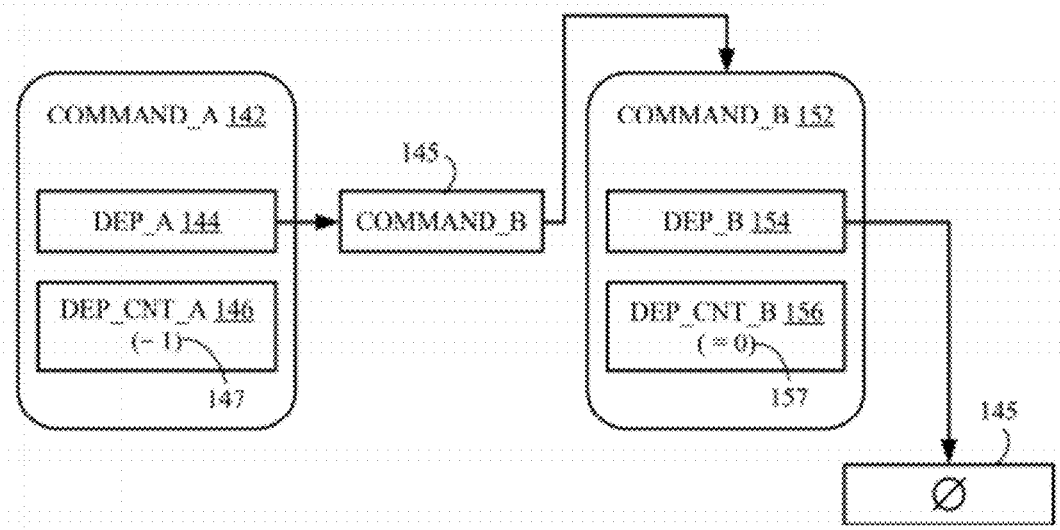
FIG. 3 is a block diagram representing the first issued computing command structure of FIG. 2 and a second command structure that depends upon the first command.

FIG. 3 is a block diagram representing command_A 142 of FIG. 2 and a second command, i.e. a "command_B," 152 that depends upon command_A 142. Like command_A 142, command_B 152 includes storage for a list of dependent commands, i.e. "dep_B" 154, and a count of the number of dependents, i.e. dep_cnt_B 156. In this example, dep_B 154 would be set to a value of "NULL" 155 and dep_cnt_B 156 is set to a value of '0' 157. It should be noted that, with the introduction of command_B 152, the value 145 of dep_A 144 now indicates that command_B 152 depends upon command_A 142 and the value 147, which is set to a value of '1', indicates that there is one command that depends upon command_A 142.

Figure 4:
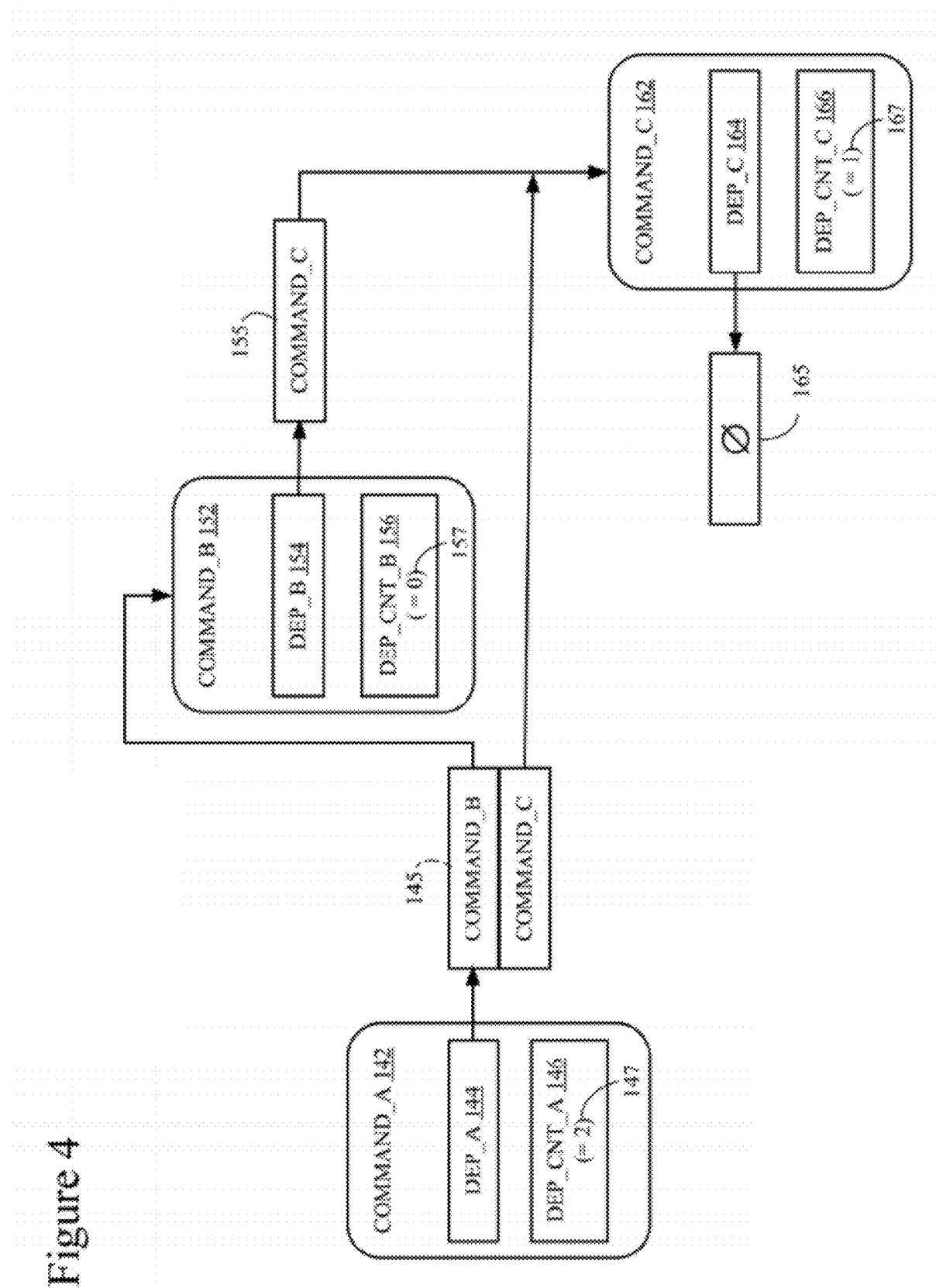
FIG. 4 is a block diagram representing the first and second issued computing command structures of FIGS. 2 and 3 and a third command structure that depends upon the first and second command.

FIG. 4 is a block diagram representing command_A 142 of FIGS. 2 and 3, command_B 152 of FIG. 3 and a third command, i.e. a "command_C," 162 that depends upon both command_A 142 and command_B 152. Like command_A 142 and command_B 152, command_C 162 includes storage for a list of dependent commands, i.e. "dep_C" 154, and a count of the number of dependents, i.e. dep_cnt_C 166. In this example, dep_C 164 would be set to a value of "NULL" 165 and dep_cnt_B 166 is set to a value of '0' 167.

It should be noted that, with the introduction of command_C 162, the value 145 of dep_A 144 now indicates that both command_B 152 and command_C 162 depend upon command_A 142 and the value 147, which is set to a value of '2', indicates that there are two commands that depends upon command_A 142. In addition, the value 155 of dep_B 154 now indicates that command_C 162 depends upon command_B 152 and the value 157, which is set to a value of '1', indicates that there is one command that depends upon command_B 152. The enqueuing of commands represented in FIGS. 2-4 is described in more detail below in conjunction FIG. 5 and an Enqueue Command process 200 described in conjunction with FIG. 6.

Figure 5:
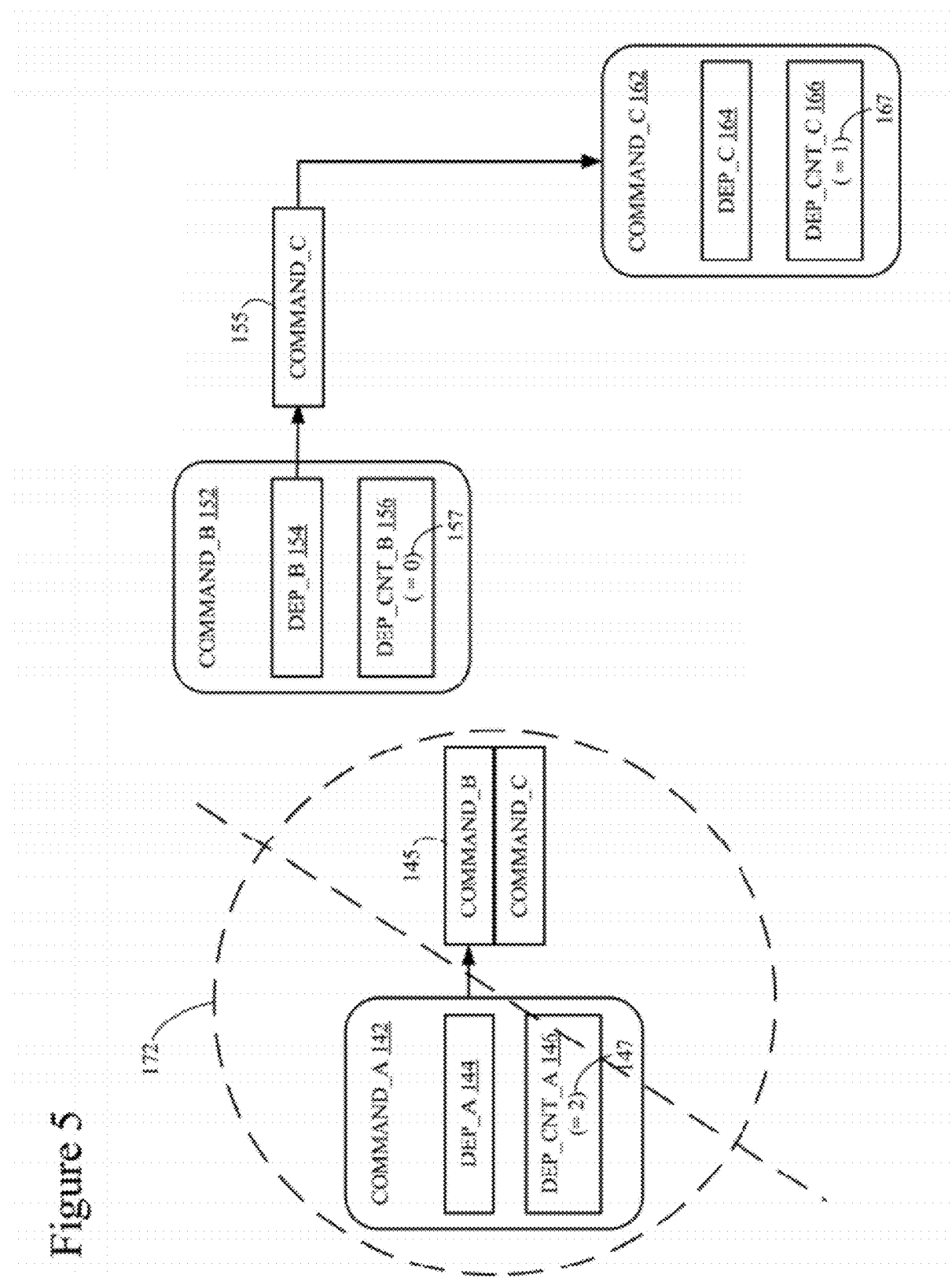
FIG. 5 is a block diagram representing the first, second and third issued computing command structures of FIGS. 2-4 once the first command has completed execution.

FIG. 5 is a block diagram representing the command_A 142 (FIGS. 1-3), command_B (FIGS. 2 and 3) and command_C 162 (FIG. 3) after command_A 142 has completed execution, which is indicated by means of a dotted lines 172 that surround command_A 142 and command list 145 (FIGS. 1-3). Command_B 152 is updated to reflect that there are no commands that command_B 152 depends upon as indicated by value 157, which is not equal to '0', stored in dep_cnt_B 156. In addition, Command_C 162 is updated to reflect that that command_B 152 only depends upon command_B 152 as indicated by value 167, which is not equal to '1', stored in dep_cnt_C 166. Processing associated with FIG. 5 is explained in more detail below in conjunction with FIG. 6.

Figure 6:
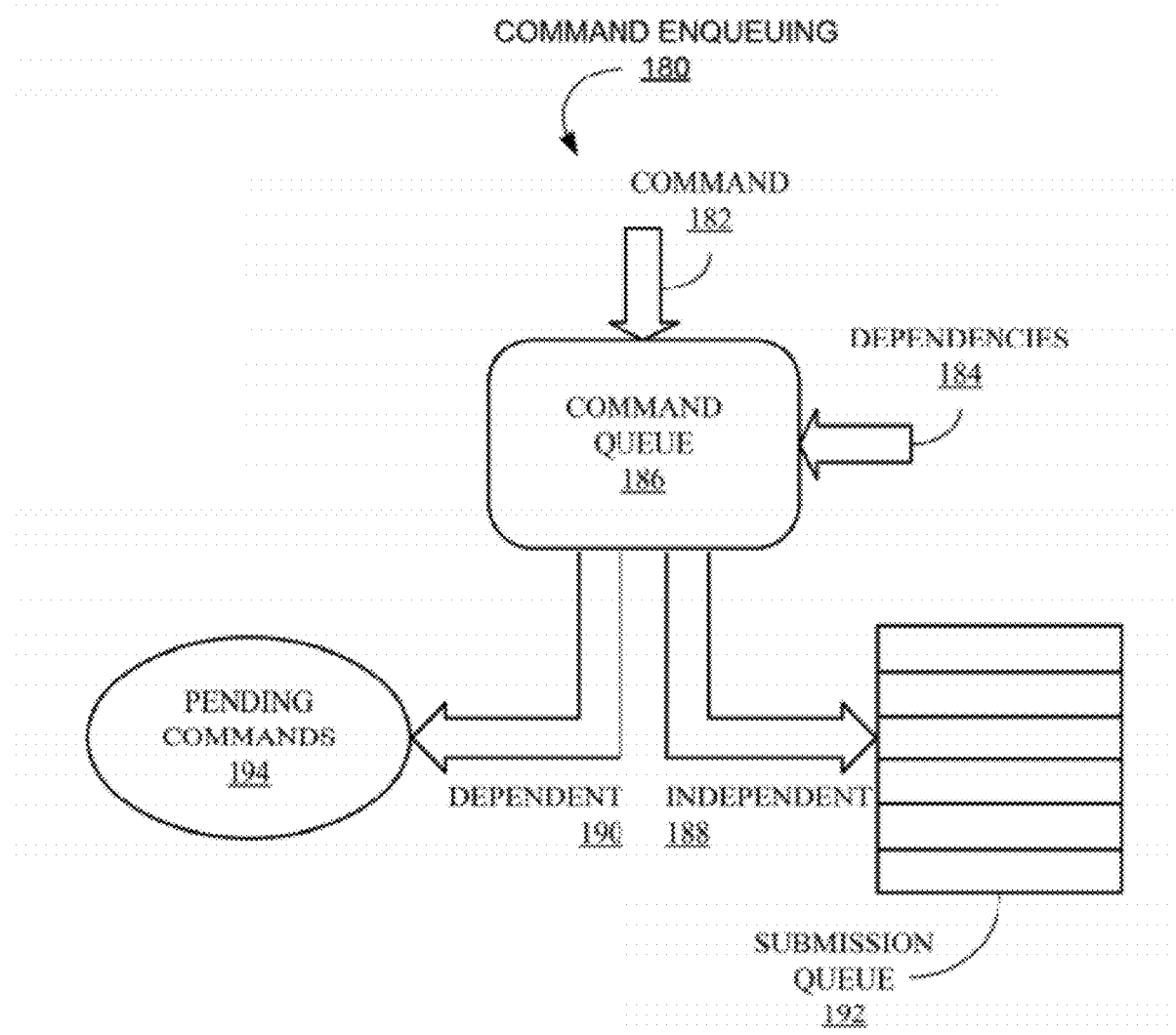
FIG. 6 is a block diagram illustration of an example of commands flowing through various queues according to the claimed subject matter.

FIG. 6 is a block diagram illustration of an example of a command enqueue data flow 180 according to the claimed subject matter. In the example, logic associated with FIG. 6 is stored on data storage (FIG. 1) and executed in conjunction with QCS 116 (FIG. 1) on client system 102. One process associated with data flow 180 is described in more detail below in conjunction with Enqueue Commands process 200 (see FIG. 7). Commands 182 and corresponding dependencies 184 are transmitted to a command queue 186. At that point, each command is determined to be either independent 188, i.e. having no outstanding dependencies, or dependent 190. Independent commands 188 are transmitted to a submission list 192, indicating that each command is ready for execution, and dependent commands are transmitted to a pending commands pool 194. Pending poll 194 is not a queue or a list but rather represents information stored in one or more dependency lists such as 145 (FIGS. 2-5) and 155 (FIGS. 3-5). It should also be noted that command queue 186 is circular, which should be a familiar design to those with skill in the computing arts.

Figure 7:
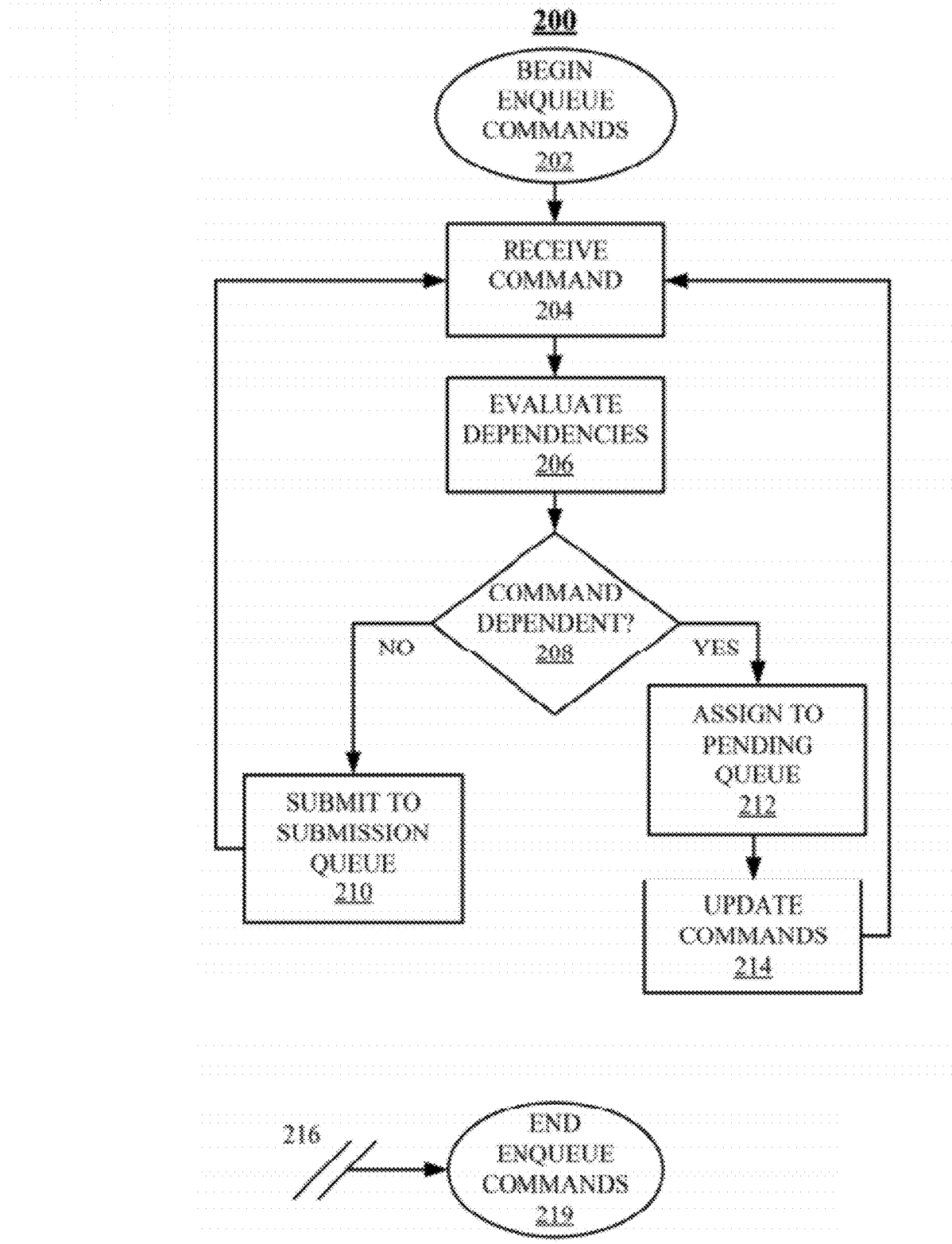
FIG. 7 is a flowchart of an example of an Enqueue Command process that handles the posting of commands to various queues.

FIG. 7 is a flowchart of an example of an Enqueue Commands process 200 that handles the posting of commands to various queues (see FIG. 6). In this example, logic associated with process 200 is stored on data storage (FIG. 1) and executed in conjunction with QCS 116 (FIG. 1) on client system 102. Process 200 starts in a "Begin Enqueue Commands" block 202 and proceeds immediately to a "Receive Command" block 204.

During block 204, process 200 waits for a command to be transmitted to command queue 186 (FIG. 6). Once a command and information on corresponding dependencies have been received, process 200 proceeds to "Evaluate Dependencies" block 206 during which the relationship between the received command and dependencies is evaluated. It should be noted that dependencies may be either implicit or explicit. For example, command_C 162 (FIGS. 3 and 4) may be transmitted to command queue 182 with information indicating a dependency only on command_B 152. However, since command_B 152 is dependent upon command_A 142, command_C 162 would also be implicitly dependent upon command_A 142 as well. Of course, it could be understood that command_C 162 may also be transmitted with information that explicitly indicates a dependence upon command_A 142.

During a "Command Dependent?" block 208, process 200 determines whether or not the transmitted command is independent or dependent. If the determination is "No," i.e the command is independent, process 200 proceeds to a "Submit to Submission Queue" block 210 during which the command received during block 204 is submitted to a submission list 192 (FIG. 8) that receives and processes commands that are ready for execution. If process 200 determines that the received command is dependent, control proceeds to an "Assign to Pending Queue" block 212 during which process 200 submits the received command to pending commands pool 194 (FIG. 6).

During an "Update Commands" block 214, commands in both submission list 192 and pending commands pool 194 are updated to reflect any new dependencies, either implicit or explicit. For example, if command_C 162 (FIGS. 4 and 5) is received, command_B 152 (FIGS. 3-5), which is stored in pending pool 194 is updated to reflect the fact that command_C 162 depends upon command_B 152. In other words, dep_B 154 (FIGS. 3-5) and dep_cnt_B 156 (FIGS. 3-5) are updated to reflect the explicit dependency of command_C 162. In addition, command_A 142 (FIGS. 2-5), which is stored in submission list 192, is updated by modifying dep_A 144 (FIGS. 2-5) and dep_cnt_A 146 (FIGS. 2-5) to reflect the dependency of command_C 162 upon command_B 152.

Following blocks 210 and 214, process 200 returns to block 204 during which process waits for the transmission of another command and processing continues as described above.

Finally, process 200 is halted by means of an interrupt 216, which passes control to an "End Enqueue Commands" block 219 in which process 200 is complete. Interrupt 216 is typically generated when the OS, application, etc. of which process 200 is a part is itself halted. During nominal operation, process 200 continuously loops through the blocks 202, 204, 206, 208, 210, 212 and 214, processing commands such as commands 142, 152 and 162 as they are generated and received.

Figure 8:
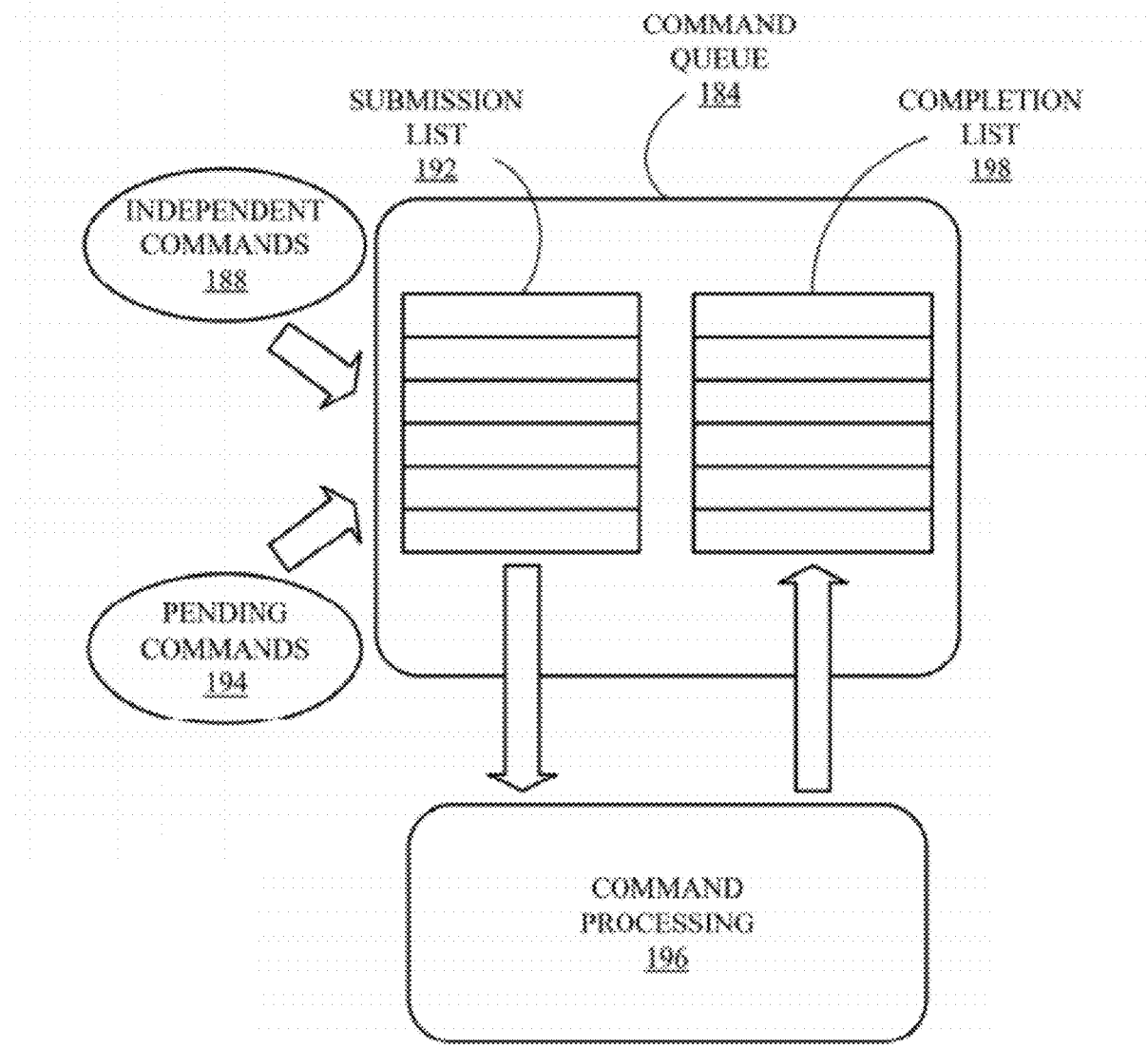
FIG. 8 is a block diagram illustrating an example of command queue processing.

FIG. 8 is a block diagram illustrating an example of data flow associated with command queuing processing. In the example, logic associated with FIG. 8 is stored on data storage (FIG. 1) and executed in conjunction with QCS 116 (FIG. 1) on client system 102. One process associated with FIG. 8 is described in more detail below in conjunction with Command Queuing process 220 (see FIG. 9). It should be noted that command queue 184 is a conceptual command queue that represents the information, logic and infrastructure of actual queues.

Command queue 184 receives both commands 188 that have been determined to be independent (see 208, FIG. 7) and commands from pending pool 194 (FIG. 6) that no longer depend upon another command (see command_B 152, FIG. 5). Commands are determined to have had dependencies resolved when the dependency count, such as dep_cnt_A 146 (FIGS. 2-5), dep_cnt_B 156 (FIGS. 3-5) and dep_cnt_C 156 (FIGS. 4 and 5) are equal to a value of '0'. Both types of commands 188 and 194 are placed on submission list 192 and ultimately transmitted in turn to command processing 196 for execution.

Once a command has been executed by command processing 196, the command is transmitted to a completion list 198. Commands in completion list 198 are processed in a first-in/first-out (FIFO) fashion so that commands in pending pool 194 may be updated to reflect resolved dependencies (see 232, FIG. 9). Processing associated with command queuing is described in more detail below in conjunction with FIG. 9.

Figure 9:
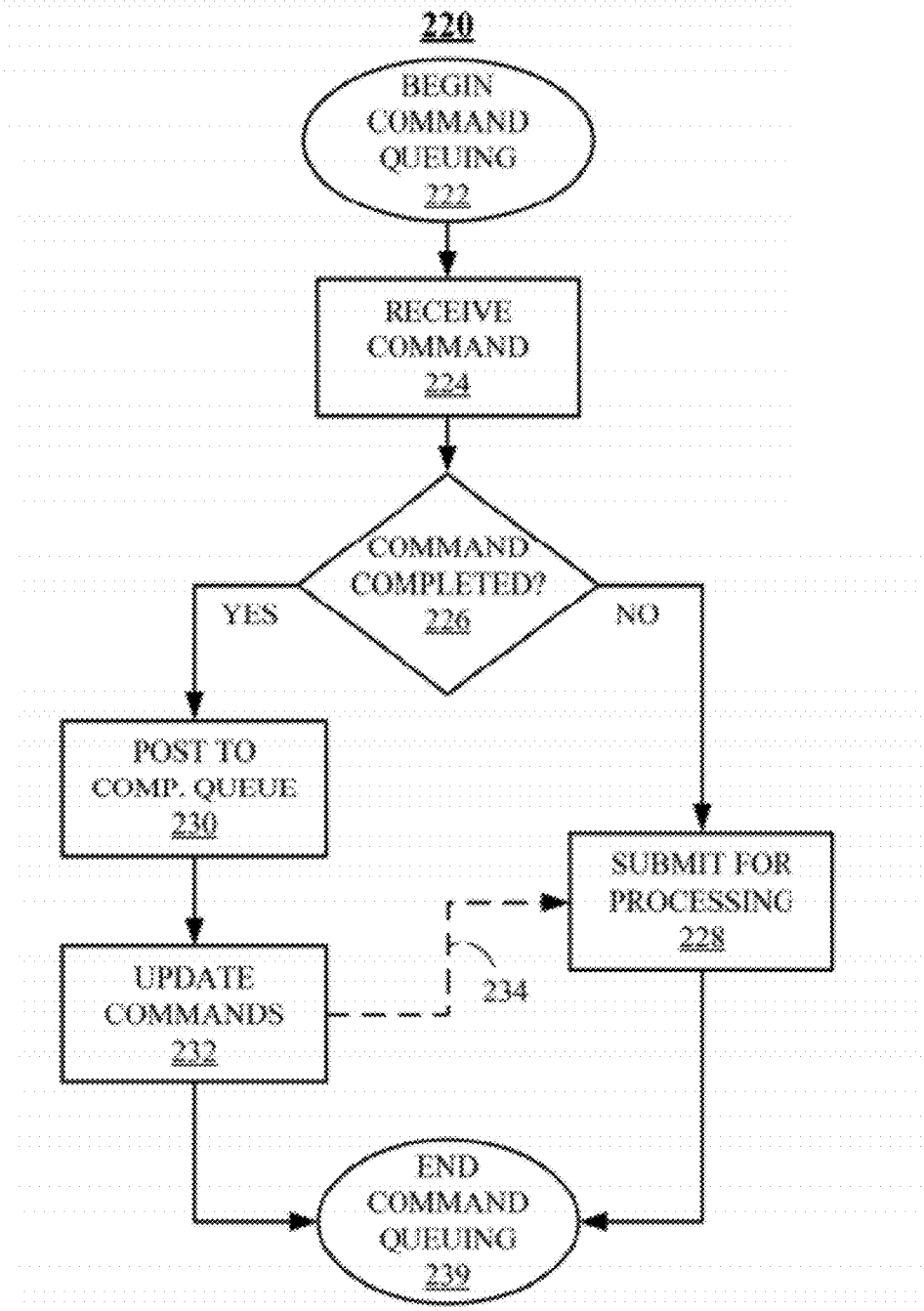
FIG. 9 is a flowchart of an example of a Command Queuing process that manages commands submitted to a command queue.

FIG. 9 is a flowchart of an example of a Command Queuing process 220 that manages commands submitted to command queue 184 (FIG. 8). In this example, logic associated with process 220 is stored on data storage (FIG. 1) and executed in conjunction with QCS 116 (FIG. 1) on client system 102. Process 220 starts in a "Begin Command Queuing" block 222 and proceeds immediately to a "Receive Command" block 224.

During block 224, a command is received at command queue 184 as an independent command 188 (FIG. 8), a pending command in which dependencies have been resolved 194 (FIG. 8) or as a command from command processing 196 (FIG. 8) that has been executed. During a "Command Completed?" block 224, process 220 determines whether or not the command received during block 224 has been transmitted from command processing 196, i.e. a command that has been executed. If not, processes 220 proceeds to a "Submit for Processing" block 228 during which the command is submitted to command processing 196.

If process 220 determines that the received command has already been executed by command processing 196, control proceeds to a "Post to Completion Queue" block 224 during which the received command is posted to completion list 198 (FIG. 8). During an "Update Commands" block 224, process 220 updates dependency variables such as dep_B (FIGS. 3-5), dep_Cnt_B (FIGS. 3-5), dep_C (FIGS. 4 and 5) and dep_cnt_C (FIGS. 4 and 5) with respect to commands on pending pool 194. The updating of commands on pending pool 194 may also involve a determination that all dependencies have been resolved and posting the command on submission list 192 for transmission to command processing 196, as indicated by a dotted line 234. Finally, control proceeds to an "End Command Queuing" block 224 during which process 220 is complete.

FIG. 10 is a block diagram illustrating an example of barrier processing 250 of commands with respect to a standby barrier 252, an active barrier 258 and a marker 260 according to the claimed subject matter. Newly enqueue commands 254 are transmitted to command queue 186 (FIG. 6) and are associated with and become dependencies 253 of the current standby barrier 252. Standby barrier 252 is an entry on command queue 186 that is employed to track outstanding activity on queue 186. Incoming commands 254 are added as dependencies 253 of standby barrier 252 and, thus standby barrier 252 is dependent upon newly incoming commands 254. As commands are completed 254, they are removed from being dependent upon standby barrier 252.

At any time, standby barrier 252 may be "promoted." A promoted standby barrier is closed from tracking queue activity, becomes active in the command stream and has dependencies like a conventional command. Once promoted, a standby barrier is replaced with a new, empty standby barrier that accepts any new incoming commands.

Standby barrier 252 may be promoted in one of two ways: 1) by conversion into an active barrier 262 or 2) by conversion into a marker 264. An active barrier 258 occupies the command queue's 186 "active barrier" slot, causing all future incoming commands to become dependent upon it. As stated above, active barrier 256 is dependent upon the outstanding commands on command queue 186 prior to promotion 262. By association, any new incoming commands are "blocked" or dependent on the completion of commands issued before the barrier was promoted. This technique is employed to synchronize command queue 186.

A marker 260 is not blocking so it does not assume the role of an active barrier. However like an active barrier, marker 260 assumes dependencies from the commands that were outstanding on queue 186 prior to promotion. In this manner, marker 260 becomes a tracking point for these commands. Unlike active barrier 258, new incoming commands 254 do not become dependent upon marker 260. In other words, standby barriers 252 and active barriers 258 are employed to synchronize and track commands through command queue 186; markers 260 are employed to track commands through command queue 186.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
    a processor;
    a physical memory, coupled to the processor;
    logic, stored on the memory and executed on the processor, for:
        receiving a first command for execution in a computing system;
        entering the first command in a first standby barrier, wherein the first standby barrier depends upon the first command;
        promoting the first standby barrier to become a promoted barrier;
        generating a second standby barrier, wherein the second standby barrier depends upon the first standby barrier;
        receiving a second command for execution in the computing system;
        entering the second command in the second standby barrier, wherein the second standby barrier depends upon the second command;
        executing the first command; and
        removing the first command as a dependency of the promoted barrier.

2. The apparatus of claim 1, wherein the promoted barrier is an active barrier such that the new standby barrier depends upon the active barrier and the second command.

3. The apparatus of claim 1, wherein the promoted barrier becomes a marker such that the marker depends upon the first command and the new standby barrier depends upon the marker and the second command.

4. The apparatus of claim 1, the logic further comprising logic for:
    creating a custom barrier, wherein the custom barrier is dependent upon any active barriers that may exist;
    explicitly stating dependencies on the custom barrier; and
    receiving a third command for execution in the computing system,
    wherein the third command depends upon the custom barrier; and
    wherein the custom barrier depends upon the first command only if the corresponding dependency is explicitly declared and depends upon the second command only if the corresponding dependency is explicitly declared.

5. The apparatus of claim 4, the logic further comprising logic for tracking execution of the first, second and third commands through the computing system based upon information stored in the second standby barrier, the promoted barrier and the custom barrier.

6. The apparatus of claim 1, further the logic comprising logic for tracking execution of the first and second commands through the computing system based upon information stored in the second standby barrier and the promoted barrier.

7. The apparatus of claim 1, the logic further comprising logic for:
    associating dependency information relating to a dependent command on any command or barrier on which the dependent command depends; and tracking dependencies based upon the associated dependency information.

8. A computer programming product, comprising:
a physical memory;
logic, stored on the memory for execution on a processor, for:
receiving a first command for execution in a computing system;
entering the first command in a first standby barrier, wherein the first standby barrier depends upon the first command;
promoting the first standby barrier to become a promoted barrier;
generating a second standby barrier, wherein the second standby barrier depends upon the first standby barrier;
receiving a second command for execution in the computing system;
entering the second command in the second standby barrier, wherein the second standby barrier depends upon the second command;
executing the first command; and
removing the first command as a dependency of the promoted barrier.

9. The computer programming product of claim 8, wherein the promoted barrier is an active barrier such that the new standby barrier depends upon the active barrier and the second command.

10. The computer programming product of claim 8, wherein the promoted barrier becomes a marker such that the marker depends upon the first command and the new standby barrier depends upon the marker and the second command.

11. The computer programming product of claim 8, the logic further comprising logic for:
creating a custom barrier, wherein the custom barrier is dependent upon any active barriers that may exist;
explicitly stating dependencies on the custom barrier; and
receiving a third command for execution in the computing system,
wherein the third command depends upon the custom barrier; and
wherein the custom barrier depends upon the first command only if the corresponding dependency is explicitly declared and depends upon the second command only if the corresponding dependency is explicitly declared.

12. The computer programming product of claim 11, the logic further comprising logic for tracking execution of the first, second and third commands through the computing system based upon information stored in the second standby barrier, the promoted barrier and the custom barrier.

13. The computer programming product of claim 8, further the logic comprising logic for tracking execution of the first and second commands through the computing system based upon information stored in the second standby barrier and the promoted barrier.

* * * * *